March 31, 1953 — E. E. VAN HAM — 2,633,023
DIRECT READING GAUGE FOR COLD FLUIDS
Filed Feb. 12, 1952 — 2 SHEETS—SHEET 1
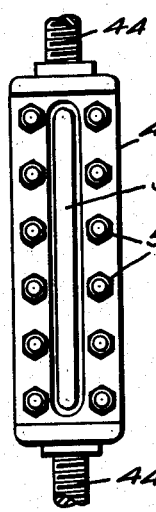
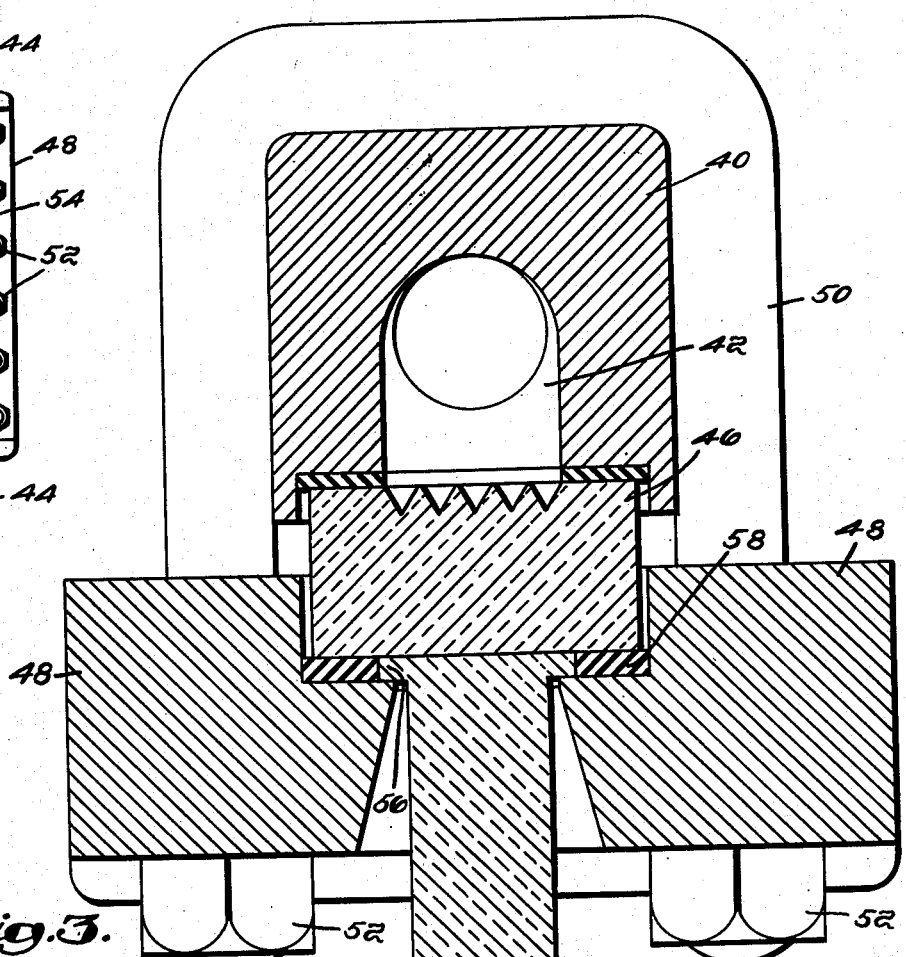
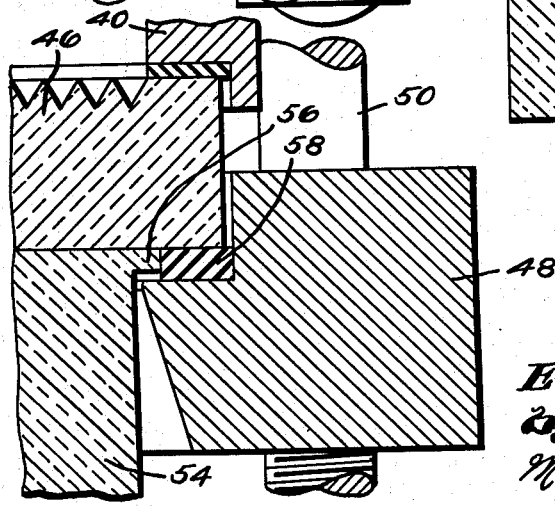
Inventor:
Ernest E. Van Ham,
by Emery, Booth, Townsend
Miller Weidner Attys March 31, 1953  E. E. VAN HAM  2,633,023
DIRECT READING GAUGE FOR COLD FLUIDS
Filed Feb. 12, 1952  2 SHEETS—SHEET 2
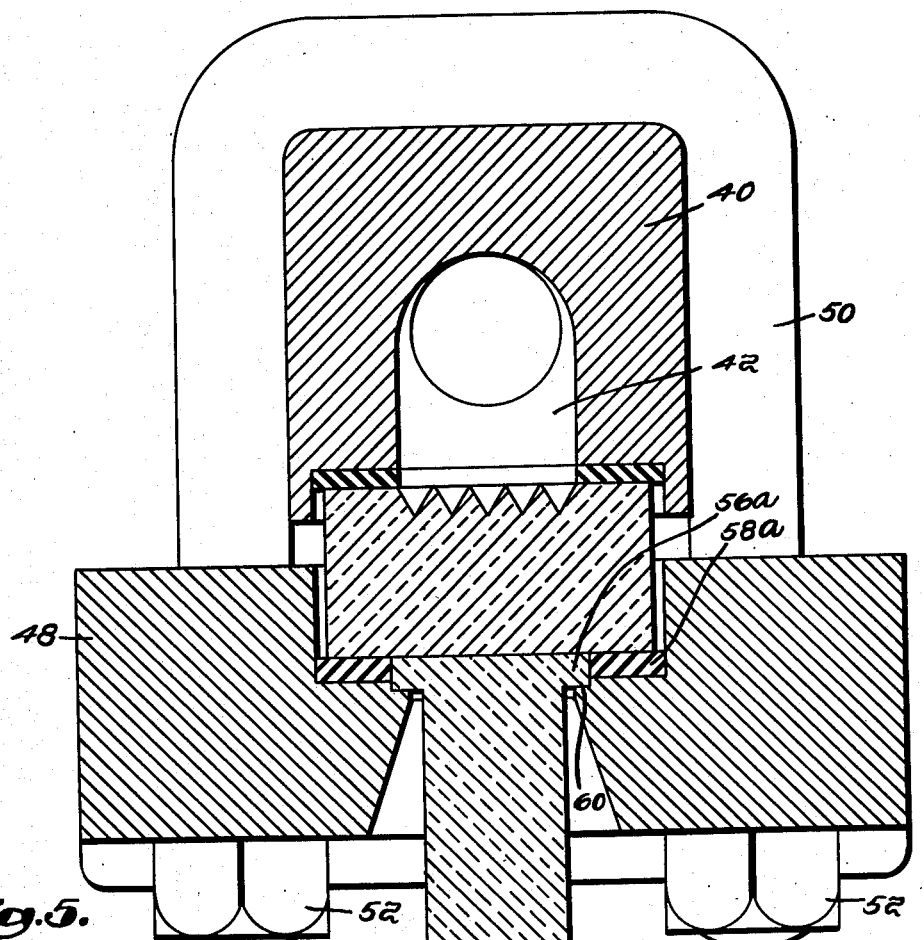
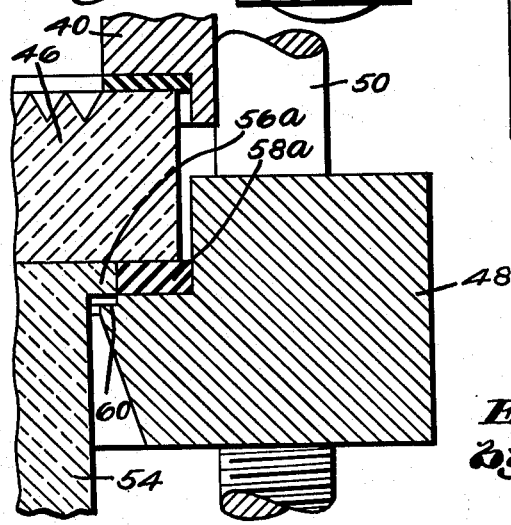
Inventor:
Ernest E. Van Ham,
by Emery, Booth, Townsend, Miller
+ Weidner  Attys

Patented Mar. 31, 1953

2,633,023

UNITED STATES PATENT OFFICE 2,633,023

DIRECT READING GAUGE FOR COLD FLUIDS

Ernest E. van Ham, Somerville, Mass., assignor to Jerguson Gage & Valve Company, Somerville, Mass., a corporation of Massachusetts Application February 12, 1952, Serial No. 271,237

3 Claims. (Cl. 73—323)

This invention relates to direct reading gages for use with cold fluids such as are described in my Patent No. 2,550,175, April 24, 1951 (and in particular to those of the kind illustrated in Figs. 4, 5 and 7 of said patent, suitable particularly for use with heavy pressures) wherein a block of transparent material extends out beyond the thickness of any frost accumulating on the gage and provides a window free from frost through which the interior of the gage is visible. The invention more particularly relates to a construction which provides for positioning such a block.

My invention will be well understood by reference to the following description taken in connection with the accompanying drawings wherein—

Fig. 1 is a front elevation of a gage;

Fig. 2 is a transverse section on line 2—2 of Fig. 1 on an enlarged scale;

Fig. 3 is a fragmentary sectional view showing parts in Fig. 1 separated as they would be before being clamped together;

Fig. 4 is a section similar to Fig. 2, but disclosing a modified construction; and Fig. 5 is a fragmentary section similar to Fig. 4 showing the parts of Fig. 4 separated.

In Figs. 1 and 2 there is shown as an example of the invention a known type of liquid level gage adapted for use with high pressures. It comprises a substantial metal body 40 having a chamber 42 ported at both ends to provide for placing it in communication, as by means of pipes 44 indicated in Fig. 1, with the body of liquid to be gaged, above and below the normal maximum and minimum levels thereof. The chamber is open at at least one side (and herein there is shown, by way of example, a gage of the single glass type), the opening being closed by a heavy glazing 46. Frame-like cover 48 co-operates with the margins of the glazing 46 and clamps it in position, herein by means of the U-bolts 50 and cooperating nuts 52. In the example shown the arms of the U-bolts lie adjacent the sides of the body 40 and reinforce it against internal pressure. The features of construction shown in Figs. 1 and 2 as so far described are conventional and not in themselves new to this application.

As described in my patent previously referred to, the outer face of the glazing 46 throughout the area thereof exposed at the opening of frame 48 is covered by block 54 of transparent material of relatively low heat conductivity and of such depth that its outer face will not be chilled to condensing temperatures by conduction to the interior or to the metal parts of the gage, and projecting beyond the front face of the gage to such a distance that frost accumulating on the frame will not work in over the outer face. The block may for instance be transparent methylmethacrylate resin such as that known by the commercial name of "Lucite." In my prior patent above referred to I have described the block 54 as cemented to the face of the glass. In the present application I provide an improved mounting.

It might be thought that it would be merely necessary to provide a flange on the block 54 to be clamped by the frame against the glass, just as the glass is clamped in the case of an ordinary gage without utilizing such a block. However, because of the strong pressures exerted by the clamping bolts, and necessary to retain the fluid in the gage, this is impractical. In the event of a fire, or if the temperature by some other means were unintentionally raised to the point where the Lucite began to soften, the pressure on the glass would be relaxed and the fluid would leak out. In certain applications of such a gage it is necessary to clean it from time to time by means of steam, and this raises the temperature sufficiently to cause buckling of the flange because the load imposed by the frame and by the internal pressure extrudes the softened material from the joint. It will be recalled that various plastic articles are shaped in manufacture by an extruding process.

In the embodiment of the invention shown more particularly in Fig. 2, the block 54 is provided with a peripheral flange 56. Conveniently the block and its flange may be machined from a solid block of plastic so that the flange is not only effectively integral with the body of the block, but actually the same piece of material. A packing 58 encircles the flange, that is, lies radially outward from the same, and rests against the glass 46. The frame 48 has a rearwardly facing surface of such extent as to lie opposite both the packing 58 and the flange 56 and therefore may be considered as having two inner surface portions, one opposite the packing and one opposite the flange, although both lie in the same plane. As best seen in Fig. 3, the packing 58, before compression, is of substantially greater thickness than the thickness of the flange 56. Thus, in certain practical applications, it may be an eighth of an inch thick while the flange is $\frac{3}{32}$ of an inch. Therefore when the gage is assembled and the nuts 52 set up, the packing is first compressed and develops the necessary glass-clamping pressures before the inner portion of the frame contacts the flange. A slight additional pressure is sufficient to retain the block yet the pressure exerted on the flange is light. Even if the block were entirely melted away the seal of the gage would be maintained. If the material of the block is softened, the pressure on the flange is not increased by any internal pressure and extrusion of the flange and a possible buckling of the inner surface of the block are prevented.

In Figs. 3 and 4 I have illustrated a modification in which a packing 58a is provided of the same thickness as the flange 56a, but the inner portion of the frame 48 where it opposes the flange is relieved at 60, being offset outwardly relative to the portion which opposes the packing. As illustrated, this is formed merely by machining away a portion of the frame to provide a rabbet. While in the construction shown the entire frame is a single unitary body of metal, obviously the internal portion 60 may be considered an auxiliary frame cooperating with the portion outward of it which takes the principal pressures involved, just as some picture frames are built up of a series of frames nesting one inside of the other. When the parts, proportioned as shown in Fig. 5, are clamped together, they assume the position of Fig. 4. The packing 58a is compressed to seal the gage before the flange 56a is contacted by the wall of the rabbet 60, with the same results as in Figs. 2 and 3.

In Fig. 5 the thickness of the uncompressed gasket is shown as equal to the thickness of the flange, the depth of the rabbet at 60 providing for the necessary differentiation. Obviously cases intermediate between the construction of Figs. 2 and 3 on the one hand, and 4 and 5 on the other, are possible provided that the thicknesses of the uncompressed packing and of the flange and the relative positions of the opposing portions of the frame are so proportioned that the packing is compressed by one portion to form a pressure-tight seal before the flange is contacted by the other portion.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A direct reading gage for cold fluids comprising a chambered body having an opening in a wall thereof, a glass covering the opening, a block of transparent material of relatively low heat conductivity in front of the glass, the block being of substantial depth outwardly of the glass to preclude chilling of its outer face to condensing temperatures by conduction to the glass and disposing said face beyond the thickness of frost accumulating on laterally adjacent portions of the gage and a frame-like cover for clamping the glass in position; characterized by the fact that the block has a flange at its inner side, that a packing encircles the flange and rests on the glass, that the frame has inner surface portions overlying the packing and the flange respectively and that the thicknesses of the uncompressed packing and of the flange and the relative position of said portions are so proportioned that the packing is compressed by one portion to form a pressure-tight seal before the flange is contacted by the other portion.

2. A direct reading gage for cold fluids comprising a chambered body having an opening in a wall thereof, a glass covering the opening, a block of transparent material of relatively low heat conductivity in front of the glass, the block being of substantial depth outwardly of the glass to preclude chilling of its outer face to condensing temperatures by conduction to the glass and disposing said face beyond the thickness of frost accumulating on laterally adjacent portions of the gage and a frame-like cover for clamping the glass in position; characterized by the fact that the block has a flange at its inner side, that a packing encircles the flange and rests on the glass, that the frame extends over packing and flange and is relieved opposite the latter so that the packing is compressed before the flange is contacted.

3. A direct reading gage for cold fluids comprising a chambered body having an opening in a wall thereof, a glass covering the opening, a block of transparent material of relatively low heat conductivity in front of the glass, the block being of substantial depth outwardly of the glass to preclude chilling of its outer face to condensing temperatures by conduction to the glass and disposing said face beyond the thickness of frost accumulating on laterally adjacent portions of the gage and a frame-like cover for clamping the glass in position; characterized by the fact that the block has a flange at its inner side, that a packing encircles the flange and rests on the glass, that the frame extends over packing and flange and that the uncompressed packing is thicker than the flange and is compressed by the frame before it contacts the flange.

ERNEST E. van HAM.

REFERENCES CITED

The following references are of record in the file of this patent:

UNITED STATES PATENTS

| Number | Name | Date |
|---|---|---|
| 1,113,490 | Sargent | Oct. 13, 1914 |
| 1,380,080 | Sargent | May 31, 1921 |
| 2,550,175 | Van Ham | Apr. 24, 1951 |